UNITED STATES PATENT OFFICE.

ABRAHAM J. GREINER, OF CHICAGO, ILLINOIS.

COMPOUND FOR PRESERVING FOOD.

SPECIFICATION forming part of Letters Patent No. 504,724, dated September 12, 1893.

Application filed February 11, 1893. Serial No. 461,912. (No specimens.)

*To all whom it may concern:*

Be it known that I, ABRAHAM J. GREINER, a citizen of the United States, residing at Chicago, county of Cook, and State of Illinois, have invented a new and useful Improvement in Preserving Compositions to be Used for the Preservation of Foods, of which the following is a specification.

My invention relates to certain new and useful improvements in preserving food, in its natural or raw state, with the object in view of making a composition which is cheap, simple and efficient as a preservative.

My composition consists of the following ingredients, combined in the proportions herein stated viz: powdered charcoal, six ounces; flowers of sulphur, one and one-half pounds; sugar, one-half pound; corn starch, one tablespoonful; beeswax, one-half ounce. For fish and meats add saltpeter, one-half ounce; Cayenne pepper, one-half teaspoonful, ginger root ground, one-half teaspoonful.

To use the above composition mix the ingredients by agitation; the beeswax should be added after the others are mixed. Place the food to be preserved in a room or box (which can be closed tightly) upon shelves. If fruits or vegetables are to be treated, place also in the room or box, vessels filled with water in which the fruits or vegetables are to be placed after being treated. Now place the composition in a pan at the bottom of the room or box over a small fire or heated coals, until the composition passes off in fumes. Use about two and one-half pounds of the composition per one hundred pounds of food treated. Allow the food to remain in the box or room subjected to the fumes for three to four hours. Place the fruits and vegetables in the vessels containing the water which is by this time impregnated by the fumes, cover the opening of the vessels with any substance such as thin cloth but not air tight. The fish or meats after being subjected to the fumes the same length of time as for fruits, vegetables and the like, should be hung up or placed in boxes in a cool dry room.

The function of the ingredients of the compound are as follows: the charcoal, sulphur, sugar, saltpeter and Cayenne pepper are used as preservatives, but after being treated the food very often loses its natural taste and flavor. To prevent this I use starch and beeswax the fumes of which cause the food to retain its natural taste and flavor, thereby adding greatly to its value. The fumes of ginger destroy the taste and smell of the sulphur which remains upon the fish and meats after being treated. The ginger also prevents insects from molesting the fish and meats.

I am aware that some of the ingredients named herein have been used for similar purposes, but I am not aware that all the ingredients of my composition, in the proportions stated have been used together.

What I claim as new, and desire to secure by Letters Patent of the United States, is—

The herein described composition to be used for the preservation of food, consisting of charcoal, sulphur, sugar, corn starch, beeswax, saltpeter, Cayenne pepper and ginger, in the proportions as specified.

In testimony whereof I have affixed my signature in the presence of two witnesses.

ABRAHAM J. GREINER.

Witnesses:
WALTER L. WILLEY,
JOSEPH H. WILLEY.